United States Patent [19]

Glass

[11] Patent Number: 4,642,799

[45] Date of Patent: Feb. 10, 1987

[54] SYSTEM AND PROCESS FOR OPTICAL PROCESSING OF INFORMATION

[75] Inventor: Alastair M. Glass, Rumson, N.J.

[73] Assignee: AT&T Bell Laboratories, Murray Hill, N.J.

[21] Appl. No.: 676,676

[22] Filed: Nov. 30, 1984

[51] Int. Cl.[4] ............................................. G11C 11/34
[52] U.S. Cl. .................................... 365/114; 365/118
[58] Field of Search ............... 365/111, 112, 113, 114, 365/118, 125, 128, 215, 234; 350/355

[56] References Cited

FOREIGN PATENT DOCUMENTS 53-148244 12/1978 Japan ..................................... 365/114

Primary Examiner—Joseph A. Popek
Attorney, Agent, or Firm—Bruce S. Schneider

[57] ABSTRACT

An optical processor is formed by utilizing a doped electrooptic semiconductor material. By making information in the form of light incident on the crystal, a refractive index change is effected. This information, in the form of a refractive index change, is then read utilizing a second light source.

20 Claims, 3 Drawing Figures

SYSTEM AND PROCESS FOR OPTICAL PROCESSING OF INFORMATION

BACKGROUND OF THE INVENTION

1. Field of the Invention

This invention relates to information processing and, in particular, information processing done optically.

2. Art Background

Although essentially all information processing is presently done utilizing semiconductor electronics, it has, for a long time, been contemplated to do such processing optically. That is, it has been a desired goal to encode information in the form of an optical image, process this information, record the processed information in a suitable non-linear optical recording medium, and then read the recorded information utilizing a second light source. The processing of the information is accomplished in a variety of ways. For example, the optical information is subjected to optical interactions, i.e., is subjected to a lens or holographic interference. It is also possible to process the information by first manipulating a non-linear optical recording medium, e.g., blocking selected regions in the medium to prevent recording in these areas or illuminating a medium in which information has been previously recorded to modify the recorded information and second, reading the recorded information. (It is possible that the light beam employed for reading also contains information which causes manipulation of the information.) Various recording media have been utilized in the investigation of a suitable optical processing system. The most widely investigated recording media have been photographic films—a recording medium in which information cannot be erased. Greater versatility for processing is obtained, however, with a medium in which recorded information is alterable, i.e., an erasable medium. Widely investigated erasable media involve oxygen-containing crystals such as lithium niobate ($LiNbO_2$) and bismuth silicate ($Bi_{12}SiO_{20}$). These crystals are utilized because they both are electrooptic, i.e., they undergo a refractive index change upon application of a field, and photorefractive, i.e., a localized electric field and thus a localized refractive index change are produced by (1) the absorption of light to produce mobile carriers and (2) the separation of the resulting charges. Separation of charge is generally effected in two ways—by relying on inherent drift or diffusion of the carriers or by applying an external field by forming electrodes on the crystal and applying a voltage between these electrodes. The localized refractive index changes are detectable by observing the effect of the crystal on a second incident source of light. The speed at which the refractive index produced in the crystal decays determines the information processing rate. By necessity, the decay to a level of at most 30 percent of the initial value should occur within a time equal to the desired processing rate so that the next bit of information can be processed without unacceptable interference from the previous bit.

One method for processing optical information involves the use of holographic light interactions. In this procedure, a first light source which may or may not carry information is interacted with a second light source carrying information. The resulting interference pattern induces periodic refractive index changes in the crystal which, in turn, produce a diffraction grating. Incident reading electromagnetic radiation is diffracted in these regions. The diffracted light is easily discernible, and the extent of diffraction together with the phase of this diffracted light conveys all the information present in the initial information-carrying light source(s).

In a second processing approach, an image represented by spatial variations in light intensity is made incident on a crystal. The localized incident light produces corresponding localized regions of modified refractive index. When the reading light interacts with these regions, it undergoes a phase change relative to the light that traverses regions having no refractive index modification. This phase modification, and thus the image it represents, is discernible by using, for example, polarizers.

Although materials such as bismuth silicate and lithium niobate do allow recording of information, they generally do not allow information processing at speeds greater than approximately 100 images/sec. The processing rate typically attainable with conventional electronic semiconductor devices is $10^8$ bits/sec. Thus for images containing less than $10^6$ bits, electronic processors are preferable. Systems have been proposed (although no actual experimentation has been reported) for optical processing of information at extremely high speeds, i.e., speeds greater than $10^{12}$ bits/sec. For example, it has been suggested by A. M. Glass at the Conference on Lasers and Electro-Optics, Baltimore, May 1983, that the use of undoped gallium arsenide having a background impurity concentration of less than $10^{15}$ $cm^{-3}$ could perhaps provide processing speeds greater than $10^{15}$ bits/sec. However, continuous wave lasers and other optical equipment that operate at sufficiently high powers for processing speeds faster than $10^{12}$ bits/sec are extremely large and expensive. Thus, the proposed optical systems are either too slow to compete with available semiconductor electronics or are, at present, not economic.

SUMMARY OF THE INVENTION

An optical processing system utilizing doped optoelectronic materials has been found to operate with material response times in the range $10^{-4}$ to $10^{-6}$ seconds. (The response time is the storage time of recorded information in the entire recording region of the medium.) With typical images having approximately $10^6$ bits, such materials operate in the $10^{-10}$ to $10^{-12}$ bit/sec range. Additionally, this system is adaptable for use with semiconductor lasers emitting in the infrared, e.g., continuous wave lasers which are available at a nominal price. Optoelectronic semiconductor materials such as doped gallium arsenide, doped indium phosphide, doped cadmium telluride, and doped cadmium sulfide are exemplary of a wide range of useful materials. For example, doped II–VI and III–V semiconductor materials having the zinc blend crystal structure are appropriate. These systems are adaptable for use in a wide variety of applications including not only holographic processing but also direct image processing of information.

DETAILED DESCRIPTION

Figure 1:
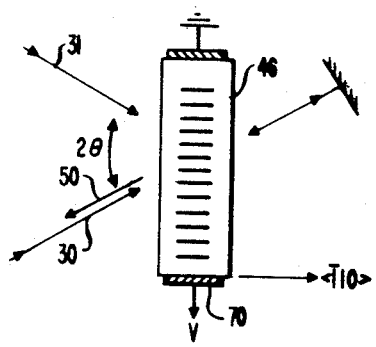
FIGS. 1 and 3 are illustrative of configurations suitable for practicing the invention.

The optical systems of the invention include a doped optoelectronic semiconductor material acting as the recording medium, at least one source of light carrying information, i.e., a yttrium aluminum garnet laser doped with magnesium, and at least one source of light for reading recorded information. (It is possible that the reading and recording lights are, in turn, derived from the same light source, e.g., a laser.) The processing of information through (1) optical interaction, e.g., holography and the use of lenses, and/or (2) the modification of the recording medium is well known and is described in various reviews such as *Optical Holography*, R. Collier, L. H. Lin, and C. B. Burckhardt, Academic Press, New York (1971), and *Introduction to Diffraction, Information Processing and Holography*, F. T. S. Yu, MIT Press, Massachusetts (1973). (It is possible to process information through the interaction of two or more light sources, each carrying information, or by employing two or more reading sources, each designed to selectively read information.) The relative spatial configuration of the information source, the reading source, and the semiconductor crystal is essentially the same as those systems described for crystals such as bismuth silicate and lithium niobate. Reading of information for closely spaced, i.e., typically 0.2 $\mu$m to 3.0 $\mu$m, changes in refractive index is advantageously done by monitoring the diffraction pattern induced in the reading light, while reading widely spaced refractive index changes, i.e., 0.03 mm to 5 mm, is advantageously accomplished utilizing phase-sensitive detection such as the use of polarizers. (Spacing is defined as the medium distance between adjacent local maxima of the index change measured in the direction perpendicular to incoming light.) Such detection schemes have been described in "The Photorefractive Effect," *Optical Engineering*, 17, A. M. Glass, page 470 (1978).

In the invention, doped optoelectronic semiconductor material is utilized as the recording medium. This doped semiconductor material, i.e., material having a resistivity in the range $10^3$ to $10^9$ ohm-cm, is considered to be desirable for this invention if, upon application of a voltage of less than 1 kV across a crystal thickness of less than 1 cm, a refractive index change of at least $10^{-6}$ is produced throughout the material. To achieve the desired resistivity, typically one or more dopants (rather than crystal defects) are employed to produce a free carrier concentration in the range $10^7$ cm$^{-3}$ to $10^{13}$ cm$^{-3}$ in the semiconductor material. (The conecntration of dopant should be substantial, i.e., the resistivity of the semiconductor material with the dopant present should differ by a factor of 2 from the resistivity in the absence of intentionally introduced dopant for crystals grown in an identical manner. This difference includes dopants introduced either to raise the free carrier concentration to the required level and/or those introduced to lower it to the required level.) Semiconductor materials are not desirable if they have excessive dopant non-uniformity, i.e., the mean deviation of dopant concentration is more than a factor of 10 over all regions of 1 $\mu$m in diameter within the recording area.) Dopants that yield the desired free carrier concentration in semiconductor materials are well known. For example, dopants such as iron and chromium tend to increase resistivity, and dopants such as sulfur, silicon, and zinc tend to decrease the resistivity. Dopants such as indium and gallium are useful in II-VI semiconductor materials.

The dopant concentration strongly affects the rate at which information is processed and the accuracy of this processing. Electronic energy levels associated with the dopant lead to the absorption, and thus recording, of incident optical information. The dopant should produce absorption in the wavelength range of the incident light that contains the information. Typical absorption characteristics of impurities in semiconductors are extensively documented. (See, for example, *Optical Processes in Semiconductors*, J. I. Pankove, pages 62-67, Dover Publications, Inc., New York (1975).) The absorption characteristics of each dopant depend not only on the dopant but also on the electronic band structure of the host semiconductor material. For example, for infrared light in the wavelength range 0.85 $\mu$m to 1.5 $\mu$m, a dopant such as iron is utilized in indium phosphide; for light in the range 0.8 $\mu$m to 1.3 $\mu$m, a dopant such as chromium is employed in gallium arsenide. (A combination of dopant species is employable to yield combined properties, i.e., a wide spectral absorption range, or a desired absorption range from a first dopant and desired electrical properties from a second.) As discussed, the dopant should be essentially uniformly distributed, i.e., within a factor of 10, through the regions of the crystal in which information is to be recorded and/or processed. The dopant concentration should be adjusted so that incident light information is not entirely absorbed in the crystal. Excessively strong absorption causes incident light to be entirely absorbed before exiting the crystal. Thus, regions of the crystal removed from the surface upon which light is incident are not subjected to this light. Since interference processing results in information being recorded in the spatial variation of refractive index change through the crystal, loss in information results from the loss of absorption in spatial regions removed from the incident surface. Therefore, the concentration of the dopant should be adjusted so that at least 5 percent, but less than 90 percent, of the incident light that enters the crystal is absorbed. If less than 5 percent of the light is absorbed, the resulting refractive index change is undesirably small, and either information is generally lost and/or undesirably high incident light intensities are required.

The particular dopant chosen and its concentration also affect the electrical properties of the crystal which, in turn, affect the processing parameters. A significant advantage of the invention is that the processing time for a bit of information is related to the resistivity of the crystal which is, in turn, dependent on dopant concentration relative to the background carrier concentration of the semiconductor material. The available processing speed is adjusted by adjusting the resistivity of the medium. For material response times sufficiently fast to yield superior bit processing rates to that easily attainable with conventional electronics, i.e., faster than 1 msec, and sufficiently slow to be employable with economic optical components, i.e., slower than 1 nsec, the crystal should be doped so that it is semi-insulating, i.e., has a resistivity in the range $10^3$ to $10^9$ ohm-cm. For example, gallium arsenide is doped with chromium to a concentration generally in the range $10^{15}$ to $10^{17}$ cm$^{-3}$, or indium phosphide is doped with iron to a concentration generally in the range $10^{15}$ to $10^{17}$ cm$^{-3}$. (The exact concentration of ion or chromium dopant required to make gallium arsenide or indium phosphide semi-insulating depends on the concentration of other impurities in the crystal which offset or augment the effect of the added dopant.) Doping of III-V semiconductor materials is generally described in articles such as *Institute of Physics Conference Series* 45, G. W. Iseler, page 144 (1979), while doping of II-VI semiconductor materials is described, for instance, in texts such as *II-VI Semiconducting Compounds,* edited by D. G. Thomas, W. A. Benjamin, Inc., New York (1967).

The dopant also affects the drift length or achievable charge separation distance of charge carriers produced by the absorption of light. The higher the dopant level, the shorter the drift length, or in the case of an applied field, the greater the applied field required to achieve a desired charge separation. The larger the charge separation distance between regions of differing recorded light illumination, the greater the resulting change in refractive index and thus the less the chance of errors in the reading of the recorded information. However, charge separation beyond the average distance between each local maximum and its spatially nearest local minimum does not further augment refractive index change. Typically, for materials such as III-V semiconductor materials with incident illumination energies in the range 500 millijoules/cm$^2$ to 5 millijoules/cm$^2$, refractive index changes of at least $10^{-6}$, corresponding to charge separation lengths of at least 3 $\mu$m, are desirable for typical applied fields. If the desired refractive index is obtained solely from charge separation resulting from diffusion, an applied field is not necessary. However, larger charge separation distances for useful dopant concentrations are often not obtainable without the use of an externally applied field. Fields greater than 50 kV/cm, although not precluded, are inconvenient since the crystal should be immersed in a dielectric other than air to avoid breakdown of the environment. However, for typical dopant concentrations in the range $10^{16}$ cm$^{-3}$ to $10^{17}$ cm$^{-3}$, fields in the range 1 kV/cm to 10 kV/cm produce sufficient charge separation for desirable refractive index changes.

Fields are generally applied to the crystal by producing a voltage drop between two electrodes on the crystal. Generally, the electrodes are placed on the crystal so that they are parallel. For the holographic recording mode, the electrodes are preferably placed on the recording medium so that their major surfaces are parallel to the propagation direction of the recording light. The parallel orientation is chosen to create transverse fields and corresponding spatial variation of the index charge. For direct image processing, it is possible to position the electrodes to that one electrode is on the surface upon which light is incident or alternatively, in the previously described parallel configuration. In the perpendicular configuration, the electrode should preferably be transparent, i.e., having an absorption of less than 30 percent, preferably less than 10 percent. Generally, electrode materials such as indium tin oxide are employed.

Typically, the thickness of the crystal in the recording and reading direction depends on the particular application. For applications relying on direct image recording using perpendicular electrodes, the crystal should have a thickness between the electrodes in the range 0.01 to 0.2 cm. Thicknesses less than 0.01 cm lead to excessively small optical interaction length, correspondingly small diffraction efficiency, and thus unacceptable reading errors. Thicknesses greater than 0.2 cm are generally not desirable because of the reduction in the density of information which is possible to record. For applications employing holographic recording using parallel electrodes, generally thicknesses in the reading and writing direction in the range 0.1 to 10 cm are utilized. Thicknesses greater than 10 cm lead to difficulties in obtaining adequate uniformity, while thicknesses less than 0.1 produce too small an interaction with the reading light.

The following examples are illustrative of the invention.

EXAMPLE 1

Experimental Configuration

A 3 mm beam emanating from a neodymium YAG laser (1.06 $\mu$m) was made incident on a telescope, 23, to increase the beam size to approximately 1 cm in diameter. The beam then struck a mirror 14 which directed it to a beam splitter 61. As a result, beams 30 and 31 emanated from the beam splitter and were directed through mirrors to the sample 46. The angle between these intersecting beams, $2\theta$ in FIG. 1 corresponding to the area around the sample in FIG. 3, was set at approximately 13 degrees. (This intersection angle yielded a sinusoidal interference pattern having a period of approximately 4 $\mu$m.) Means were provided to reflect each beam back upon itself after it traversed the sample. One of the reflected beams, 50, was directed by a beam splitter 81 to an indium gallium arsenide detector 62 to measure the intensity of the beam. Additionally, a second laser (a neodymium YAG laser emitting at 1.32 $\mu$m and having an intensity of 100 mWatts) was provided together with optical means so that its 1 mm beam was attenuated to a power of approximately 1 mWatt, and was directed through the sample. The direction of the beam, 80, was set so that upon diffraction in the sample, the diffracted signal impinged through beam splitter 81 on the indium gallium arsenide detector, 62. A diffraction efficiency of the grating produced by the interference of beams 30 and 31 was measured in one embodiment by comparing the intensity of straight-through reflected light 50 to the diffracted light emanating from the interaction of the diffraction grating in the sample with the reflected light beam 52. When the diffracted light was being measured, the straight-through light was blocked using a shutter (not shown) and vice-versa. The diffraction efficiency was also measured using the light from the 1.32 $\mu$m laser by a similar expedient of measuring the ratio of straight-through 80 versus diffracted light 84 from this laser. The position of the detector and the filter positioned in front of the detector was adjusted so that either the light at wavelength 1.32 $\mu$m or the light at 1.06 $\mu$m, depending on the measurement being made, was observed. In this manner, interference from the two reading sources was eliminated.

Iron-Dpoed Indium Phosphide

Figure 2:
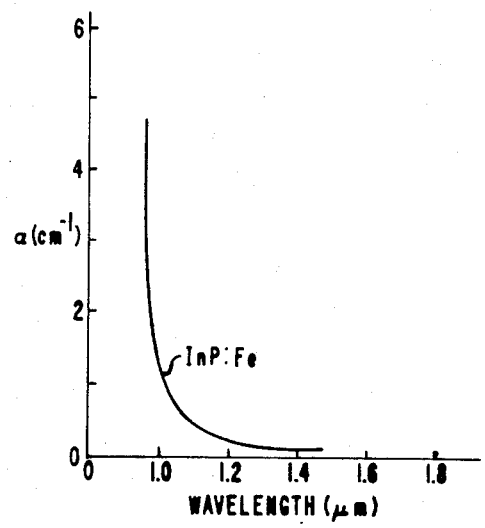
FIG. 2 is illustrative of optical characteristics in semiconductor materials suitable for the practice of the invention.

An iron-doped indium phosphide crystal was grown by the liquid encapsulated Czochralski method utilizing an iron concentration in the melt of 0.03 weight percent resulting from the addition of elemental iron powder. The use of this concentration of iron in the melt yielded a crystal having an iron ion concentration of approximately $10^{17}$ ions/cm$^3$. A sample was prepared from this boule utilizing a string saw to produce a crystal having dimensions of 0.52 cm in the <110> direction, 0.62 cm in the <100> direction, and 0.83 cm in the <$\overline{1}$10> direction. The surfaces perpendicular to the <$\overline{1}$10> direction were polished with an approximately 2 percent bromine in methanol solution by conventional means. The electrodes were placed on the crystal surfaces lying in the <100> direction utilizing silver paste and a mechanical contact. With these electrodes, the resistivity of the sample was measured at $10^8$ ohms-cm, indicating a semi-insulating material. Utilizing a Cary spectrometer, the absorption coefficient of the sample at 1.06 μm and 1.32 μm was measured and was approximately, respectively, 1 cm$^{-1}$ and 0.2 cm$^{-1}$, as shown in FIG. 2. (Aluminum oxide antireflection coatings having a thickness of approximately 1800 Angstroms were deposited onto the direction perpendicular to the $<\bar{1}10>$ direction before the optical measurement was made.)

Figure 3:
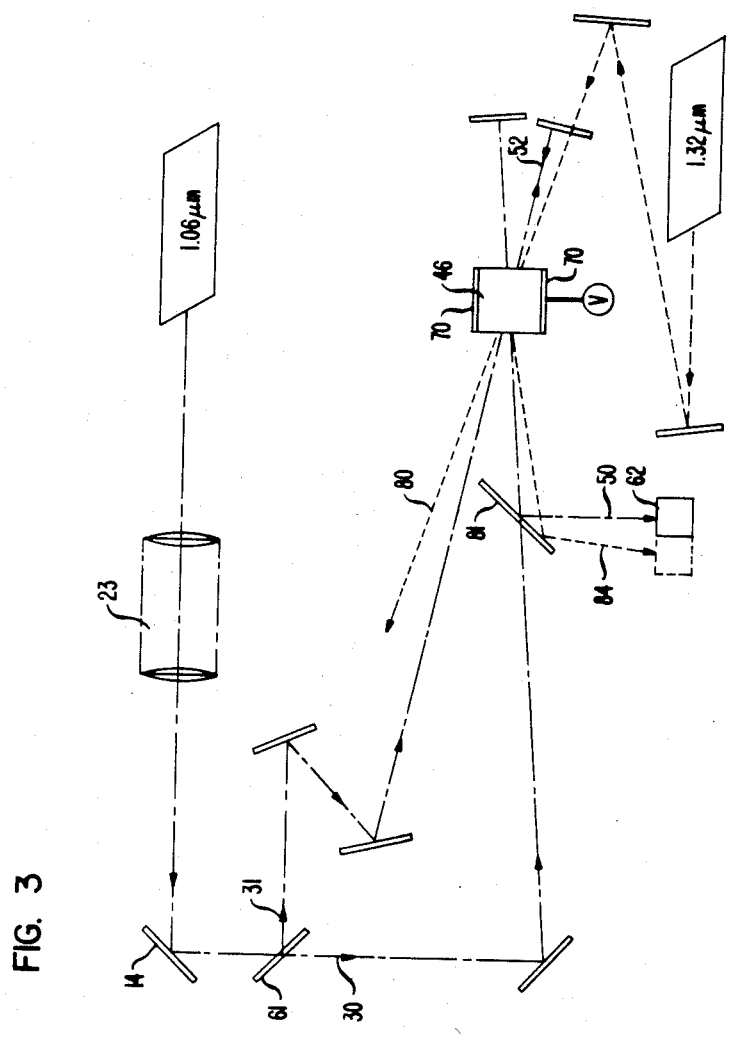

The sample 46 was placed on the sample holder so that the electrodes 70 were positioned as shown in FIGS. 1 and 3 and so that the beams 30 and 31 intersected throughout the sample. The relatively large beam size, together with this positioning, yielded an essentially uniform illumination of the sample. An electric field was applied between the electrodes utilizing a DC voltage. This voltage was adjusted so that the field was approximately 2.5 kV/cm. The intensity of beam 30 and 31 was each adjusted to 100 mWatts/cm$^2$ with neutral density filters. The diffraction efficiency measured utilizing the 1.06 μm beam was 0.35 percent. The diffraction efficiency of approximately 2 percent was also measured utilizing an applied field of 5 kV/cm.

EXAMPLE 2

The procedure of Example 1 was followed except the sample was an indium-doped cadmium telluride crystal having an approximate indium conecntration of $10^{16}/cm^3$. The crystal was approximately cubic and had sides of approximately 4 mm. The absorption coefficient of this material at 1.06 μm was approximately 0.1 cm$^{-1}$. (The anti-reflection coatings were not utilized.) To determine the diffraction efficiency, the 1.06 μm laser and the 1.32 μm laser were each Q-switched to yield pulses of approximately 300 nsec and 700 nsec, respectively, in duration. Each beam 30 and 31 had an energy of 27 microjoules per pulse. The angle $2\theta$ was approximately 4 degrees, yielding a diffraction grating having a period of approximately 12 μm. Conventional triggering elecronics were provided in order to adjust the relative pulse time of the 1.32 μm laser relative to the 1.06 μm laser. With a delay between laser pulses of 1 μsec and with an applied field of 4 kV/cm, the diffraction efficiency measured utilizing the 1.32 μm laser was approximately 0.28 percent. The diffraction efficiency decreased monotonically and reached a value of 1/e relative to this initial measurement when the delay between the laser pulses was increased to approximately 600 μsec.

EXAMPLE 3

The procedure of Example 1 was followed except a chromium-doped gallium arsenide crystal with a chromium concentration of approximately $10^{16}/cm^3$ was utilized. The boule was cut to yield a cube 4 mm on a side. No anti-reflection coating was utilized. The absorption coefficient of this particular sample was somewhat higher than desired and was approximately 12 cm$^{-1}$ at 1.06 μm. The diffraction efficiency measured with the 1.06 μm beam and an applied field of approximately 4 kV/cm$^2$ was 0.04 percent.

EXAMPLE 4

The procedure of Example 1 was followed except the 1.06 μm laser was replaced with a 1.32 μm neodymium YAG laser. Each beam 30 and 31 had a power of 21 mWatts/cm$^2$. The diffraction efficiency, with an applied field of 4 kV/cm$^2$, was approximately 0.005 percent.

What is claimed is:

1. An optical processing system comprising (1) at least one light beam carrying a signal to be processed; (2) a recording medium that undergoes a refractive index change in response to said signal or said signal after processing; and (3) at least one light beam capable of allowing the reading of refractive index variations in said recording medium
   characterized in that
   said recording medium comprises a semiconductor material and a dopant wherein said dopant is present in recording regions of said recording medium in a concentration sufficient to yield a resistivity in the range $10^3$ to $10^9$ ohm-cm, and wherein a substantial portion of said resistivity is due to said dopant.
2. The system of claim 1 wherein said light beam comprises laser light.
3. The system of claim 2 wherein said reading light comprises laser light.
4. The system of claim 1 wherein said reading light comprises laser light.
5. The system of claim 1 wherein said semiconductor material comprises a III–V semiconductor material.
6. The system of claim 5 wherein said dopant comprises a material chosen from the group consisting of iron and chromium.
7. The system of claim 1 wherein said semiconductor material comprises a II–VI semiconductor material.
8. The system of claim 7 wherein said dopant comprises a material chosen from the group consisting of indium and gallium.
9. The system of claim 1 including means for applying an electric field to said recording medium.
10. The system of claim 9 wherein said means comprises two electrodes.
11. A process for manipulating optical signal comprising the steps of (1) establishing a first light propagation train that includes said signal; (2) directing said train onto a recording medium thereby inducing a refractive index change in said medium and reading said refractive index change with a second light train
    characterized in that
    said refractive index change is induced in a time period in the range $10^{-9}$ to $10^{-3}$ seconds by employing for said recording medium a material comprising a semiconductor material having a dopant concentration sufficient to yield a resistivity in the range $10^3$ to $10^9$ ohm-cm, wherein a substantial portion of said resistivity is due to said dopant.
12. The process of claim 11 including the step of optically manipulating said signal before it impinges said recording medium.
13. The process of claim 12 wherein said manipulation comprises a holographic interaction.
14. The process of claim 12 wherein said manipulation comprises interaction with a lens.
15. The process of claim 12 wherein said second train includes a second signal.
16. The process of claim 11 wherein said second train includes a second signal.
17. The process of claim 11 wherein said semiconductor material comprises a III–V semiconductor material.
18. The process of claim 17 wherein said dopant comprises a material chosen from the group consisting of iron and chromiium.
19. The process of claim 11 wherein said semiconductor material comprises a II–VI semiconductor material.
20. The process of claim 19 wherein said dopant comprises a material chosen from the group consisting of indium and gallium.

* * * * *